United States Patent
Chen

(10) Patent No.: US 8,159,816 B2
(45) Date of Patent: Apr. 17, 2012

(54) RAIL ASSEMBLY AND COMPUTER COMPONENT SECURING DEVICE WITH A RAIL ASSEMBLY

(75) Inventor: Ta-Wei Chen, Hsichih (TW)

(73) Assignee: Wistron Corporation, Taipei Hsien (TW)

( * ) Notice: Subject to any disclaimer, the term of this patent is extended or adjusted under 35 U.S.C. 154(b) by 180 days.

(21) Appl. No.: 12/696,581

(22) Filed: Jan. 29, 2010

(65) Prior Publication Data

US 2011/0051366 A1 Mar. 3, 2011

(30) Foreign Application Priority Data

Aug. 25, 2009 (TW) .............................. 98128522 A

(51) Int. Cl.
*H05K 5/00* (2006.01)
*H05K 7/00* (2006.01)
*G11B 33/02* (2006.01)
*B65D 85/00* (2006.01)

(52) U.S. Cl. ......... 361/679.33; 361/679.32; 361/679.35; 361/679.36; 361/679.37; 361/679.38; 361/77.11; 361/77.21; 206/701

(58) Field of Classification Search ............... 361/679.33–679.38, 679.01, 804; 206/701; 360/97.01, 98.01, 137, 137 D
See application file for complete search history.

(56) References Cited

U.S. PATENT DOCUMENTS

| | | | | |
|---|---|---|---|---|
| 5,259,516 A | * | 11/1993 | Ellis ........................... | 211/41.17 |
| 6,600,648 B2 | * | 7/2003 | Curlee et al. ............. | 361/679.34 |
| 7,359,189 B2 | * | 4/2008 | Chiang et al. ............ | 361/679.33 |
| 2007/0076366 A1 | * | 4/2007 | Makabe ....................... | 361/685 |

* cited by examiner

*Primary Examiner* — Jayprakash N Gandhi
*Assistant Examiner* — Jerry Wu
(74) *Attorney, Agent, or Firm* — Steptoe & Johnson LLP

(57) ABSTRACT

A computer component securing device includes a rack and a pair of rail assemblies. The rail assemblies are mounted respectively on two sides of a computer component and are disposed on the rack. Each rail assembly includes a rail and a handle pivoted to a front end of the rail. The handle is disposed to facilitate manipulation by a user. By turning the handle pivotally relative to the rail about an angle, a portion of the rail is urged in a direction away from the computer component to interferingly engage the rack so as to position the computer component in the rack.

16 Claims, 5 Drawing Sheets

RAIL ASSEMBLY AND COMPUTER COMPONENT SECURING DEVICE WITH A RAIL ASSEMBLY

CROSS-REFERENCE TO RELATED APPLICATION

This application claims priority of Taiwanese Application No. 098128522, filed on Aug. 25, 2009.

BACKGROUND OF THE INVENTION

1. Field of the Invention

The invention relates to a rail assembly and a computer component securing device with the rail assembly, more particularly to a rail assembly to be secured to a computer component and a computer component securing device having the rail assembly.

2. Description of the Related Art

Conventionally, a computer component, such as a hard disk, an optical disk drive, a floppy disk drive, etc., is secured directly in a computer housing by screw fasteners, which is inconvenient in terms of assembly and disassembly.

In Taiwanese Utility Model No. M319439, there is disclosed a hard disk pull strap, which is a flexible or elastic band-like structure having two ends connected respectively to two sides of a hard disk. The pull strap can be pulled to move the hard disk so as to facilitate removal of the hard disk.

In U.S. Pat. No. 6,798,651, there is disclosed a computer with an accessible storage medium drive assembly, which is likewise for use on a computer component, such as a hard disk, to facilitate installation and removal of the computer component.

SUMMARY OF THE INVENTION

An object of the present invention is to provide a rail assembly that is to be secured to a computer component, that has a novel structure, and that is convenient to operate, and a computer component securing device having the rail assembly.

The rail assembly of the present invention is for securing to a computer component, and comprises a rail and a handle. The rail includes a rail body and a movable portion. The rail body is disposed to be secured to the computer component and has a front end extending beyond the computer component. The movable portion is connected to the rail body and is disposed adjacent to the front end of the rail body. The movable portion is movable to displace resiliently and laterally. The handle includes a handle body connected pivotably to the front end of the rail body and pivotable laterally relative to the rail body, and an abutting portion extending rearwardly from the handle body. When the handle body is turned pivotally about an angle relative to the rail toward the computer component, the abutting portion urges the movable portion to move in a direction away from the computer component.

The computer component securing device of the present invention comprises a pair of the aforesaid rail assemblies and a rack. The rack has two spaced-apart sidewalls and two engaging holes disposed respectively in the sidewalls. The rail assemblies are disposed to be secured respectively to two sides of a computer component and are disposed respectively on the sidewalls so that the computer component is located between the sidewalls. When the handle body is turned pivotally about an angle relative to the rail toward the computer component, the abutting portion urges the movable portion to move in a direction away from the computer component to enable the movable portion to extend partially into the engaging hole in a respective one of the sidewalls.

The advantage of this invention resides in that, with the structural configuration of the handles and the structural cooperation between the movable portions of the rails and the abutting portions of the handles, the structure of the rail assembly of the present invention is novel and distinguished over the aforementioned prior art. In addition, the handles are convenient to operate, and the computer component can be positioned in the rack.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
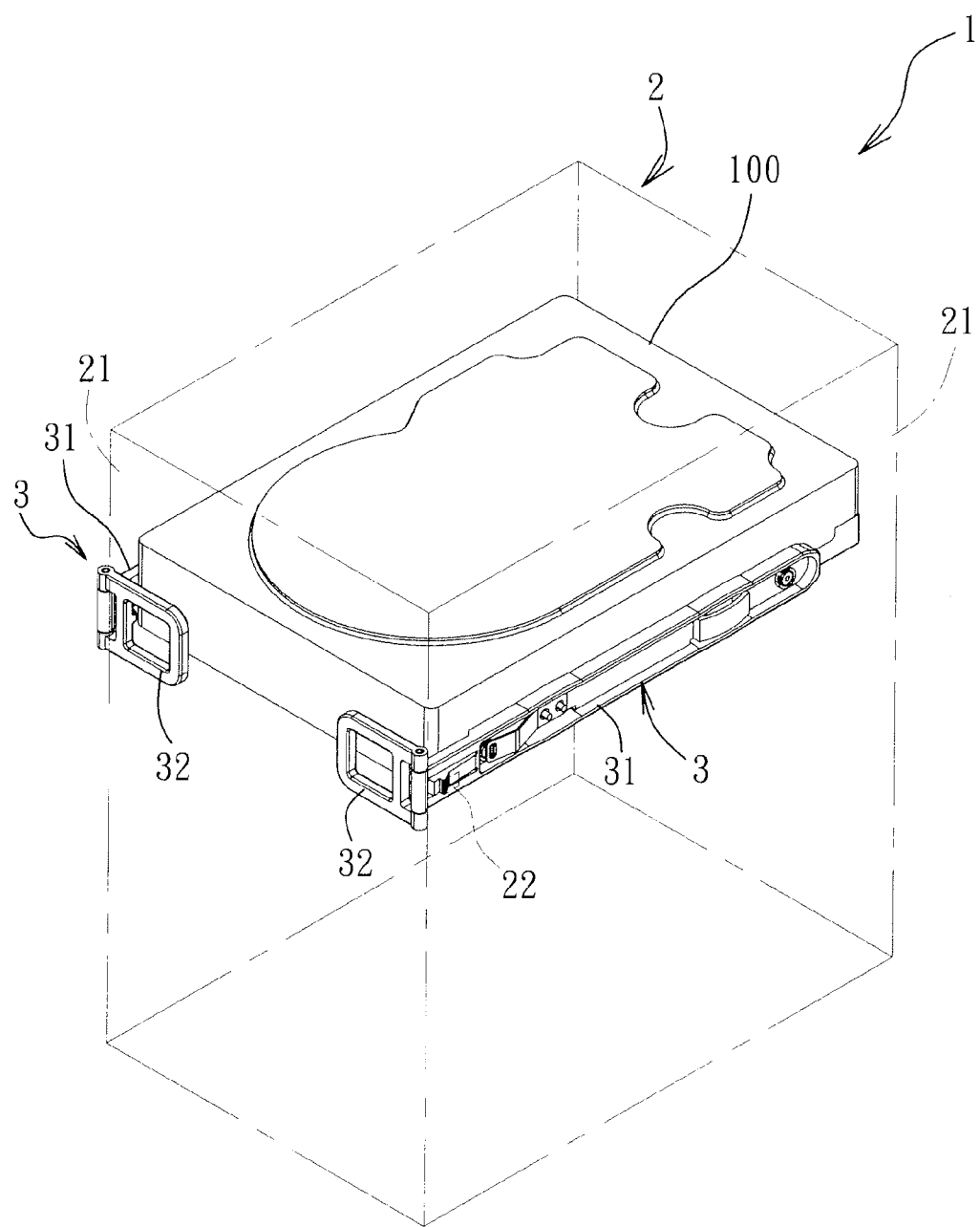
FIG. 1 is a perspective view of a preferred embodiment of a computer component securing device according to the present invention.
Figure 2:
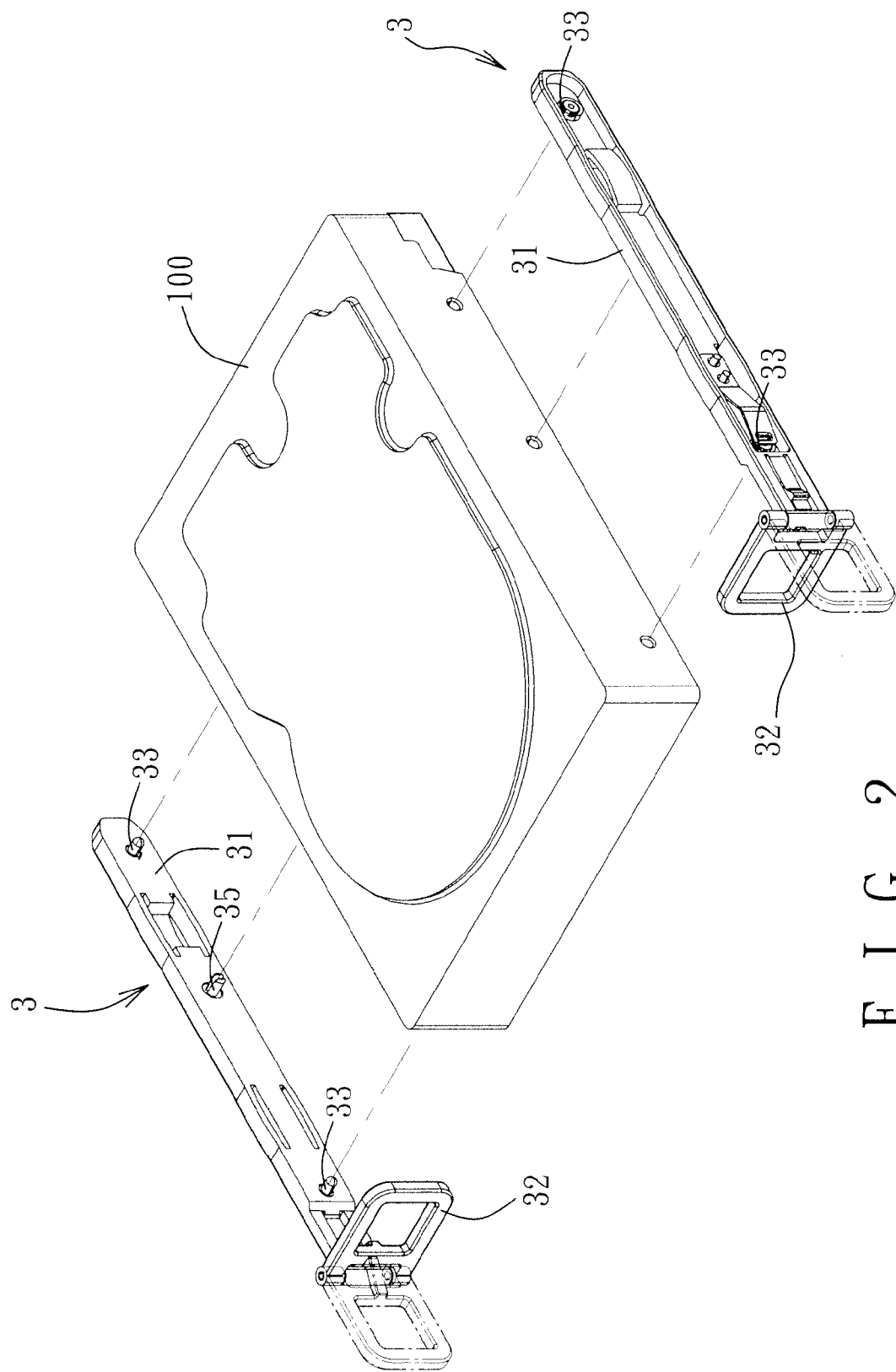
FIG. 2 is an exploded perspective view of rail assemblies of the preferred embodiment to be secured to a computer component.
Figure 5:
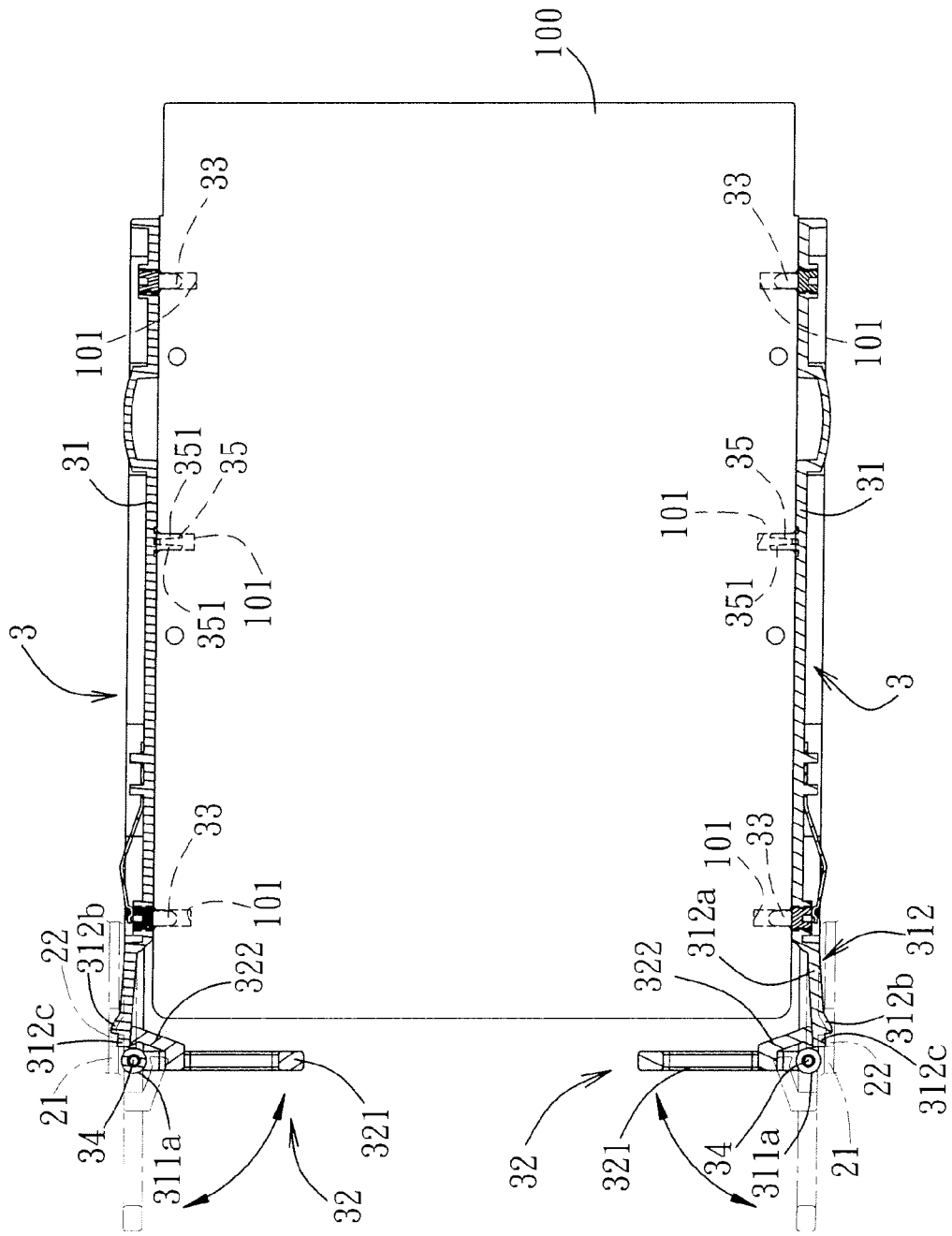
FIG. 5 is a top sectional view to illustrate how the hard disk is positioned in the rack by means of the rail assemblies of the preferred embodiment.

Referring to FIGS. 1 and 5, the preferred embodiment of a computer component securing device 1 according to the present invention is shown to include a rack 2 and a pair of rail assemblies 3. The computer component securing device 1 is disposed to position a computer component 100 therein. The computer component 100 referred to herein may be a hard disk, an optical disk drive, a floppy disk drive, etc. In this embodiment, the computer component 100 is a hard disk.

The rack 2 has two sidewalls 21 spaced apart from each other with one on the left and the other on the right. Each of the sidewalls 21 is provided with an engaging hole 22, and the engaging holes 22 correspond in position to each other. In practice, the rack 2 may be a rectangular box or case structure formed by a plurality of interconnected metal plates, and the two sidewalls 21 are the sidewalls of the box or case structure.

Referring to FIGS. 2 to 5, the rail assemblies 3 are disposed to be secured to left and right lateral sides of the computer component 100 to permit the computer component 100 to be positioned between the two sidewalls 21 of the rack 2 through the rail assemblies 3. Certainly, opposing inner side faces of the two sidewalls 21 of the rack 2 can be respectively provided with guiding structures (such as guide rails or guide wheel sets, etc., not shown) such that the rail assemblies 3 can be mounted slidably and respectively on the two sidewalls 21 to permit the computer component 100 to be slid rearward into the rack 2 or to be slid forward out of the rack 2 by virtue of the sliding engagement between the rail assemblies 3 and the sidewalls 21.

Each of the rail assemblies 3 includes a rail 31, a handle 32, a plurality of securing bolts 33, 35, and a pivot pin 34. The rail 31 includes a substantially elongated rail body 311 and a movable portion 312 connected to the rail body 311. The rail body 311 has a front end (311a). The movable portion 312 is disposed adjacent to the front end (311a) of the rail body 311, and is movable to displace resiliently and laterally relative to the rail body 311. In this embodiment, the movable portion 312 includes a resilient plate (312a) and a protruding block (312b). The resilient plate (312a) extends in a same direction as the rail body 311, and has a distal section (312c) disposed adjacent to the front end (311a) of the rail body 311. The protruding block (312b) projects laterally outward from the distal section (312c) of the resilient plate (312a). When the rails 31 of the rail assemblies 3 are secured to the computer component 100, the distal sections (312c) of the resilient plates (312a) extend forwardly beyond a front side of the computer component 100, and are movable to displace resiliently and laterally, and the protruding blocks (312b) of the movable portions 312 face away from the computer component 100.

In this embodiment, the rail body 311 and the movable portion 312 of the rail 31 of each of the rail assemblies 3 are connected rigidly. In practice, the rail body 311 is provided with a through slot 313 adjacent to the front end (311a) thereof. The through slot 313 has a U-shape that opens rearwardly and that surrounds a region which defines the movable portion 312.

Each of the rail assemblies 3 may additionally include a metal plate 36 coupled to one side of the rail body 311 of the rail 31 that faces away from the computer component 100 so as to achieve an effect of masking electromagnetic interference.

The handle 32 of each of the rail assemblies 3 includes a handle body 321 and an abutting portion 322 connected to the handle body 321. In this embodiment, the handle body 321 includes a U-shaped portion (321a) and a connecting portion (321b). The U-shaped portion (321a) has two spaced-apart side sections (321c). Distal ends of the two side sections (321c) of the handle body 321 are pivoted to the front end (311a) of the rail body 311 of the respective rail 31 by means of the pivot pin 34, and the connecting portion (321b) is connected to the two side sections (321c). In this embodiment, the abutting portion 322 is in the form of an elongated strip, extends obliquely rearward from the connecting portion (321b), and has a distal end in the form of a hook that faces laterally away from the handle body 321. When each of the rail assemblies 3 is secured to the computer component 100, the distal end of the abutting portion 322 of each of the handles 32 is located at the side of the computer component 100. Preferably, the abutting portion 322 of the handle 32 extends rearward to a length beyond the pivotal connection between the handle body 321 and the front end (311a) of the rail body 311 of the respective rail 31.

Figure 3:
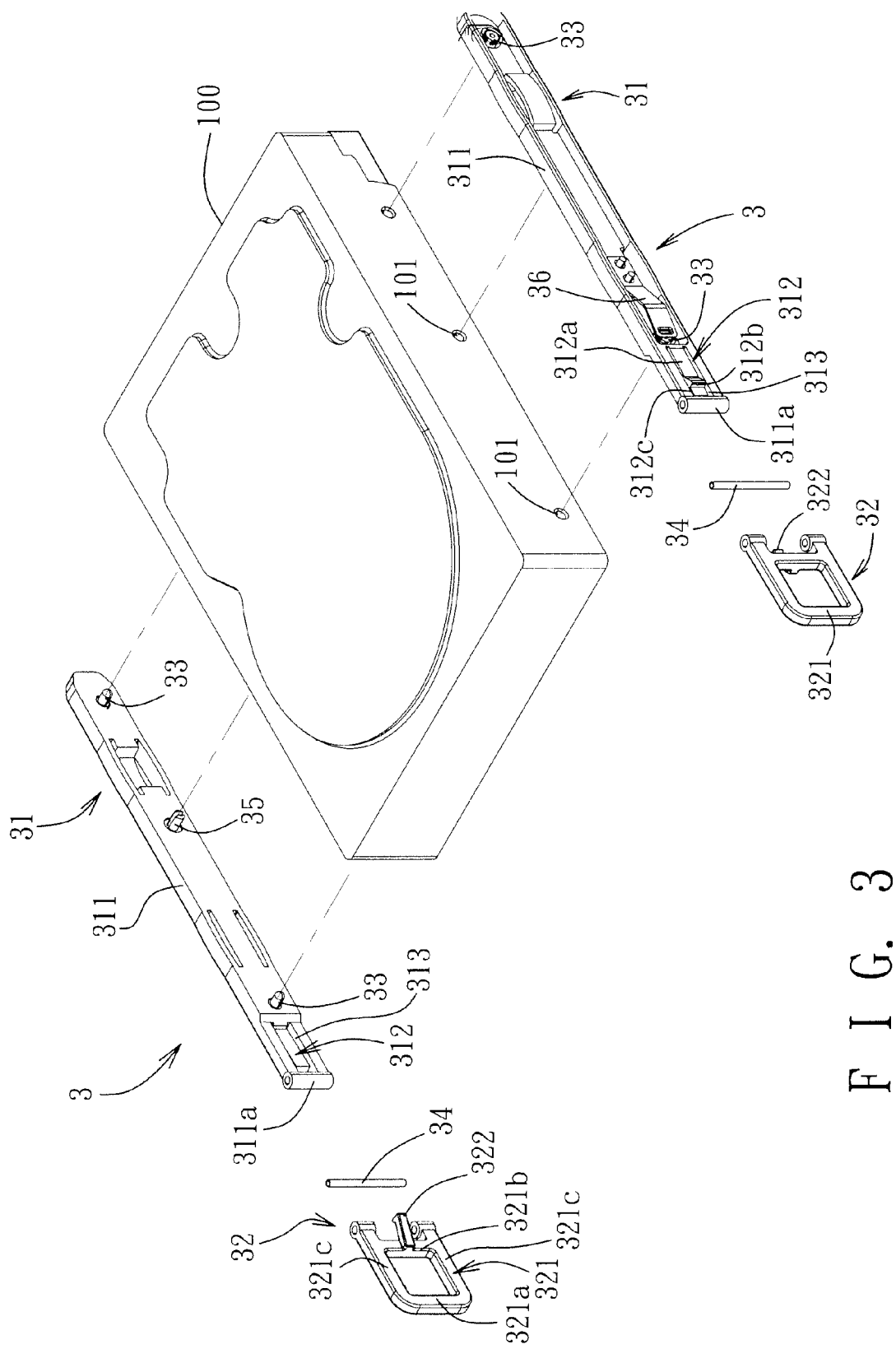
FIG. 3 is an exploded perspective view of the rail assemblies of the preferred embodiment.
Figure 4:
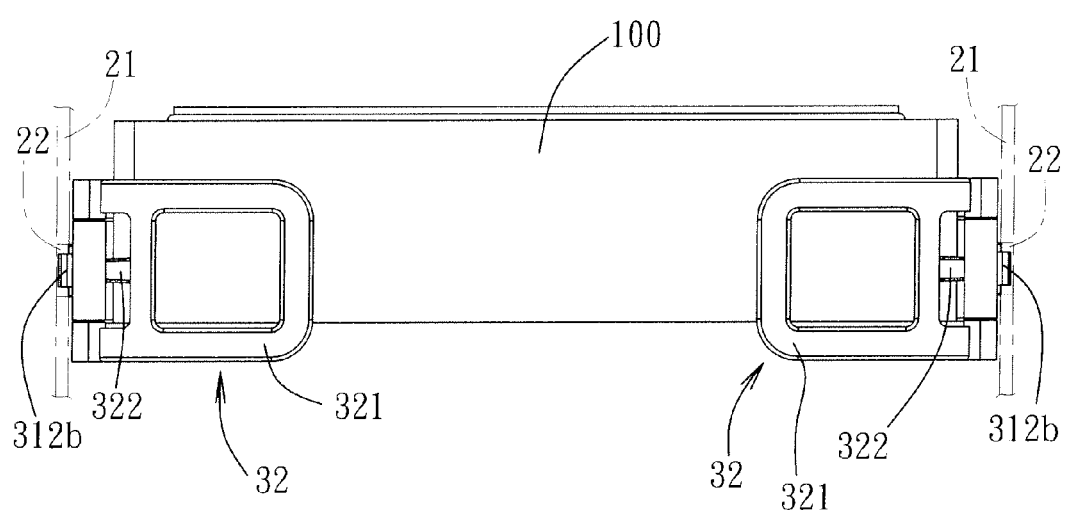
FIG. 4 is a schematic front view to illustrate how a hard disk is positioned in a rack by means of the rail assemblies of the preferred embodiment.

Referring to FIGS. 3 to 5, the rail bodies 311 of the two rail assemblies 3 are secured respectively to the left and right lateral sides of the computer component 100 by means of the securing bolts 33, 35, with the front ends (311a) thereof extending beyond the front side of the computer component 100. In this embodiment, the left and right lateral sides of the computer component 100 are each formed with threaded holes 101, and the securing bolts 33, 35 are non-threaded bolts. Moreover, the securing bolts 33, 35 may be configured to be connected integrally to the rail body 311 of the rail 31 of the respective rail assembly 3, or may be configured to be separate structures to be coupled to the rail body 311 of the rail 31 of the respective rail assembly 3.

In this embodiment, each of the securing bolts 35 has a plurality of resilient arms 351 (see FIG. 5) extending into the respective threaded hole 101 in the computer component 100 to abut against an inner wall surface defining the respective threaded hole 101, and each of the securing bolts 33 is a resilient post that can be plugged into the respective threaded hole 101 to be secured therein. Certainly, the securing bolts 33 may be configured to be screws, screw bolts, etc., and should not be limited to what is disclosed herein.

After the two rail assemblies 3 are respectively secured to the left and right lateral sides of the computer component 100, the two handles 32 are located at left and right ends of the front side of the computer component 100, and are pivotable left and right relative to the respective rails 31. If the user desires to move the computer component 100 so as to slide the computer component 100 into or out of the rack 2, the user can manipulate the two handles 32 to cause the two rails 31 to slide relative to the rack 2. Therefore, even if the space within the rack 2 is limited, since the handles 32 are pivotable to adjust the angles thereof, the user may manipulate the handles with relative ease. Thus, operation is convenient.

Furthermore, when the user pushes the computer component 100 rearwardly into the rack 2 until the protruding blocks (312b) of the movable portions 312 of the rails 31 are respectively registered with the engaging holes 22 in the sidewalls 21 of the rack 2, by turning each of the handles 32 relative to the respective rail 31 toward the computer component 100 to bring the abutting portion 322 of the respective handle 32 to abut against the distal section (312c) of the resilient plate (312a) of the respective rail 31 laterally in a direction away from the computer component 100, the protruding block (312b) projecting from the distal section (312c) of the resilient plate (312a) can be brought into engagement with the engaging hole 22 in the respective sidewall 21, thereby positioning the computer component 100 together with the rail assemblies 3 in the rack 2.

In this embodiment, through the configuration of the abutting portions 322 of the handles 32 in terms of the extension directions and lengths thereof, when the handles 32 are turned pivotally and respectively relative to the rails 31 toward the computer component 100 to be substantially parallel to the front side of the computer component 100, i.e., the handles 32 are each turned about an angle of approximately 90 degrees, the distal end of the abutting portion 322 of each of the handles 32 will be registered with the distal section (312c) of the resilient plate (312a) of the respective rail 31 and abut against the distal section (312c) of the resilient plate (312a) laterally in a direction away from the computer component 100 so that the protruding block (312b) projecting from the distal section (312c) extends into the engaging hole 22 in the respective sidewall 21, thereby positioning the computer component 100 in the rack 2.

Certainly, the configuration of the abutting portions 322 of the handles 32 is not limited to what is disclosed in the embodiment and the drawings, and any configuration that can cause the handle body 321 of each handle 32 to pivot about an angle toward the computer component 100 so as to bring the movable portion 312 of the respective rail 31 to displace outward to enable the protruding block (312b) to engage the engaging hole 22 in the respective sidewall 21 can be adopted.

If the user desires to remove the computer component 100 from the rack 2, the user may turn each of the handles 32 pivotally in a direction away from the computer component 100 so that the abutting portion 322 of the respective handle 32 moves away from the movable port ion 312 of the rail body 311 of the respective rail 31. The abutting force exerted on the movable portion 312 by the abutting portion 322 will hence disappear, so that the protruding block (312c) can be withdrawn from the engaging hole 22 in the respective sidewall 21 by virtue of the resilient restoring force of the resilient plate (312a). The user can then manipulate the handles 32 and pull the computer component 100 out of the rack 2.

In summary, with the structural configuration of the handles 32 and the structural cooperation between the movable portions 312 of the rails 31 and the abutting portions 322 of the handles 32, the structure of the rail assembly 3 of the present invention is novel and distinguished over the aforementioned prior art. In addition, the handles 32 are convenient to operate, and the computer component 100 can be positioned in the rack 2.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A rail assembly to be secured to a computer component, said rail assembly comprising:
   a rail including a rail body and a movable portion, said rail body being disposed to be secured to the computer component and having a front end that is disposed to extend beyond the computer component, said movable portion being connected to said rail body and being disposed adjacent to said front end of said rail body, said movable portion being movable to displace resiliently and laterally; and
   a handle including a handle body connected pivotably to said front end of said rail body and pivotable laterally relative to said rail body, and an abutting portion extending rearwardly from said handle body, said abutting portion urging said movable portion to move in a direction away from the computer component when said handle body is turned pivotally an angle relative to said rail toward the computer component,
   wherein said rail body is provided with a through slot that is disposed adjacent to said front end, said through slot surrounding a region that defines said movable portion.

2. The rail assembly of claim 1, wherein said movable portion includes a resilient plate and a protruding block, said resilient plate having a forwardly oriented distal section, said protruding block projecting laterally from said distal section of said resilient plate, said distal section of said resilient plate extending forwardly beyond the computer component, said protruding block facing away from the computer component, and said distal section of said resilient plate being urged by said abutting portion to displace laterally when said rail body is secured to the computer component.

3. The rail assembly of claim 2, wherein said resilient plate extends in a same direction as said rail body.

4. The rail assembly of claim 1, wherein said through slot has a U-shape which opens rearwardly.

5. The rail assembly of claim 4, wherein said abutting portion is an elongated strip that extends obliquely rearward from said handle body and has a distal end facing laterally away from said handle body, said distal end of said abutting portion being disposed at a side of the computer component and said abutting portion extending rearwardly beyond a pivotal connection between said handle body and said front end of said rail body when said rail assembly is secured to the computer component.

6. The rail assembly of claim 5, wherein said handle body includes a U-shaped portion and a connecting portion, said U-shaped portion having two spaced-apart side sections, said side sections having distal ends that are connected pivotally to said front end of said rail body, said connecting portion interconnecting said side sections, said abutting portion extending from said connecting portion.

7. The rail assembly of claim 1, wherein said abutting portion is an elongated strip that extends obliquely rearward from said handle body and has a distal end facing laterally away from said handle body, said distal end of said abutting portion being disposed at a side of the computer component and said abutting portion extending rearwardly beyond a pivotal connection between said handle body and said front end of said rail body when said rail assembly is secured to the computer component.

8. The rail assembly of claim 7, wherein said handle body includes a U-shaped portion and a connecting portion, said U-shaped portion having two spaced-apart side sections, said side sections having distal ends that are connected pivotally to said front end of said rail body, said connecting portion interconnecting said side sections, said abutting portion extending from said connecting portion.

9. A computer component securing device for accommodating a computer component, said computer component securing device comprising:
   a rack having two spaced-apart sidewalls and two engaging holes disposed respectively in said sidewalls; and
   a pair of rail assemblies to be secured respectively to two sides of the computer component and disposed respectively on said sidewalls so that the computer component is located between said sidewalls, each of said rail assemblies including
   a rail including a rail body and a movable portion, said rail body being disposed to be secured to the computer component and having a front end that is disposed to extend beyond the computer component, said movable portion being connected to said rail body and being disposed adjacent to said front end of said rail body, said movable portion being movable to displace resiliently and laterally, and
   a handle including a handle body connected pivotably to said front end of said rail body and pivotable laterally relative to said rail body, and an abutting portion extending rearwardly from said handle body, said abutting portion urging said movable portion to move in a direction away from the computer component to enable said movable portion to extend partially into said engaging hole in a respective one of said sidewalls when said handle body is turned pivotally about an angle relative to said rail toward the computer component,
   wherein said rail body is provided with a through slot that is disposed adjacent to said front end, said through slot surrounding a region that defines said movable portion.

10. The computer component securing device of claim 9, wherein said movable portion includes a resilient plate and a protruding block, said resilient plate having a forwardly oriented distal section, said protruding block projecting laterally from said distal section of said resilient plate, said distal section of said resilient plate extending forwardly beyond the computer component, said protruding block facing away from the computer component, and said distal section of said resilient plate being urged by said abutting portion to bring said protruding block into engagement with said engaging hole in the respective one of said sidewalls when said rail body is secured to the computer component.

11. The computer component securing device of claim 10, wherein said resilient plate extends in a same direction as said rail body.

12. The computer component securing device of claim 9, wherein said through slot has a U-shape which opens rearwardly.

13. The computer component securing device of claim 12, wherein said abutting portion is an elongated strip that extends obliquely rearward from said handle body and has a distal end facing laterally away from said handle body, said distal end of said abutting portion being disposed at a side of the computer component and said abutting portion extending rearwardly beyond a pivotal connection between said handle body and said front end of said rail body when each of said rail assemblies is secured to the computer component.

14. The computer component securing device of claim 13, wherein said handle body includes a U-shaped portion and a connecting portion, said U-shaped portion having two spaced-apart side sections, said side sections having distal ends that are connected pivotally to said front end of said rail body, said connecting portion interconnecting said side sections, said abutting portion extending from said connecting portion.

15. The computer component securing device of claim 9, wherein said abutting portion is an elongated strip that extends obliquely rearward from said handle body and has a distal end facing laterally away from said handle body, said distal end of said abutting portion being disposed at a side of the computer component and said abutting portion extending rearwardly beyond a pivotal connection between said handle body and said front end of said rail body when each of said rail assemblies is secured to the computer component.

16. The computer component securing device of claim 15, wherein said handle body includes a U-shaped portion and a connecting portion, said U-shaped portion having two spaced-apart side sections, said side sections having distal ends that are connected pivotally to said front end of said rail body, said connecting portion interconnecting said side sections, said abutting portion extending from said connecting portion.

* * * * *